(12) United States Patent
Dobrat

(10) Patent No.: US 6,180,077 B1
(45) Date of Patent: Jan. 30, 2001

(54) PROCESS FOR PURIFICATION OF $SiO_2$ GRANULATE

(75) Inventor: Martin Dobrat, Hanau (DE)

(73) Assignee: Heraeus Quarzglas GmbH & Co. KG, Hanau (DE)

(*) Notice: Under 35 U.S.C. 154(b), the term of this patent shall be extended for 0 days.

(21) Appl. No.: 09/268,248

(22) Filed: Mar. 15, 1999

(30) Foreign Application Priority Data

Mar. 24, 1999 (DE) .............................. 198 13 971

(51) Int. Cl.[7] .................................................. C01B 33/12
(52) U.S. Cl. ...................... 423/340; 423/335; 423/241; 423/240 S; 423/499.1
(58) Field of Search ..................... 423/340, 335, 423/241, 240 S, 499.1

(56) References Cited

U.S. PATENT DOCUMENTS

| | | | |
|---|---|---|---|
| 4,145,187 | * | 3/1979 | Oliver et al. |
| 4,276,274 | * | 6/1981 | Heckel ............................ 423/241 |
| 4,683,128 | * | 7/1987 | Orii et al. ......................... 423/340 |
| 4,956,059 | * | 9/1990 | Englishch et al. ............... 423/340 |
| 5,037,625 | * | 8/1991 | Loritsch et al. ................. 423/340 |

FOREIGN PATENT DOCUMENTS 0 737 653 A1  10/1996 (EP).

* cited by examiner

Primary Examiner—Steven P. Griffin
Assistant Examiner—Christina Ildebrando
(74) Attorney, Agent, or Firm—Andrew L. Tiajoloff

(57) ABSTRACT

A process for the purification of $SiO_2$ granulate is provided, where the $SiO_2$ granulate is supplied into a reaction zone, heated therein and exposed to a treatment gas which comprises a halogen-containing component. The treatment gas comprises a fuel gas with hydrogen-containing component, which component is combusted in the reaction zone, forming a fuel gas flame to which the $SiO_2$ granulate is exposed. The treatment gas reacts with contaminants in the $SiO_2$ granulate to create volatile reaction products which are removed from the reaction zone. The process produce $SiO_2$ granulates of high purity in a reproducible manner, while incurring relatively low expenditures in time, material and money. The apparatus for implementation of the process comprises a burner supplied with a fuel gas for generating a fuel gas flame and a with halogen-containing component, a supply device which feeds the $SiO_2$ granulate to the fuel gas flame, and a separating device for separating the $SiO_2$ granulate from a waste gas.

19 Claims, 1 Drawing Sheet

PROCESS FOR PURIFICATION OF SiO$_2$ GRANULATE

FIELD OF THE INVENTION

The invention relates to a process for the purification of SiO$_2$ granulate by supplying the SiO$_2$ granulate into a reaction zone where the granulate is heated and exposed to a treatment gas which contains a halogen-containing component, whereby the treatment gas reacts with contaminants in the SiO$_2$ granulate under formation of volatile reaction products which are removed from the reaction zone. The invention furthermore relates to an apparatus for the implementation of the said process.

FIELD OF THE INVENTION

A process of this kind, for a continuous purification of quartz powder, and an apparatus for the implementation of the process, are described in EP A1 737,653. It is proposed there to continuously supply the quartz powder to be cleaned, which has an average grain size of 106 µm to 250 µm, into an electrically heated revolving cylindrical kiln of quartz glass, where the powder successively passes through a preheat chamber, a reaction chamber and a gas desorption chamber. In the preheat chamber the quartz powder is heated to a temperature of about 800° C. and is then treated in a reaction chamber at a temperature of about 1,300° C. by a mixture of chlorine and hydrogen chloride gas. Alkali and alkaline earth contaminants in the quartz glass powder react with the chlorine-containing gas mixture to form gaseous metal chlorides. The treatment gas and the gaseous reaction products are then evacuated.

The known purification process results in a marked reduction of alkali and alkaline earth in the quartz powder. Purity of the quartz powder can be improved even more by multiple passes through the purification process. However, in many of the quartz powder uses, for example as starting material for quartz glass components in semiconductor manufacture or in optics, there are particularly high demands regarding purity of the starting material which in the known process can only be achieved with great expenditure of time, material and money.

In the known process, the purification effect is dependent on the duration of the reaction between the quartz powder and the chlorine-containing gas mixture, and on the temperature of the reaction. Chlorine reacts faster with the metallic contaminants at higher temperatures so that a better purification would be expected as the temperature increases. However, due to the softening of the granulate at high temperatures, agglomerates are formed which restrict further access of the treatment gas to the surface of the individual granules. This therefore reduces the purification effect of the treatment gas which primarily acts on a granule's surface. In addition, the quartz glass rotary kiln is not designed for treatment temperatures above about 1,400° C. Furthermore, the purification effect depends on how long the quartz powder remains in the reaction chamber. Coarse powder usually passes through the reaction chamber faster than fine powder. This can result in varying degrees of purity which can differ even within a single charge, depending on temperature, grain size, or throughput rate. This makes the known purification process difficult to reproduce.

SUMMARY OF THE INVENTION

An object of the present invention is therefore to provide a process for the purification of SiO$_2$ granulate in which a high purity of the granulate can be achieved in a reproducible manner while incurring relatively low expenditures in time, material and money, and to provide a simple apparatus suitable for implementation of the said process.

As far as concerns the process, the object is achieved on the basis of the purification process described above in that the purification gas comprises a fuel gas with a hydrogen-containing component which is burned in the reaction zone, forming a fuel gas flame to which the SiO$_2$ granulate is exposed.

In the process according to the invention, the SiO$_2$ granulate is exposed to a fuel gas flame, is heated therein, and is at the same time purified.

The purification is effected by the halogen-containing component of the treatment gas. Halogen-containing components may be fluoride, chlorine, bromium, iodine, gaseous chemical compounds of these elements and mixtures of these elements and compounds. The halogen-containing component is supplied into the reaction zone together with the fuel gas, or separately.

The granulate is heated by the reaction heat during the combustion of the hydrogen-containing component of the fuel gas. What is meant here by combustion is any form of rapid exothermic oxidation of the hydrogen-containing component which makes heating of the granulate possible. The hydrogen-containing components may be for example hydrogen or hydrocarbon compounds such as propane or acetylene. Oxygen, oxygen compounds, halogens and halogen compounds may be used for example as combustion co-reactants for the combustion of the hydrogen-containing component.

As regards the adjustment of temperature, the fuel gas flame is more flexible than the rotary kiln used in the known purification process. In particular, higher temperatures may be achieved with the fuel gas flame and the fuel gas flame permits rapid temperature changes. High temperatures are favorable for the reaction of the halogen-containing component with contaminants, especially with alkaline contaminants such as potassium or lithium. The SiO$_2$ granulate can be exposed to rapid temperature changes in the fuel gas flame and thus be heated instantly. Bursting of the SiO$_2$ granules is possible in such event, primarily bursting of granules with internal tension caused by prior damage and structural defects. Foreign atoms are frequently the cause of such defects. Bursting causes the foreign atoms to reach the free surface where they can be easily removed.

In addition to an increase of treatment gas reactivity due to high temperatures, short-lived or reactive atoms can be created in the fuel gas flame, such as for example halogen radicals which are distinguished by a particularly effective purification action.

The granulate can be supplied to the reactive zone continuously, so that the process according to the invention is also suitable for continuous purification. The SiO$_2$ granulate may be present as crystalline quartz granulate or as amorphous quartz glass granulate. The SiO$_2$ granulate is exposed to the fuel gas flame and heated by it. The heating usually takes place in the hottest, visible area of the fuel gas flame; however, the location of the heating is not decisive for the process according to the invention, of substance is merely that the fuel gas flame act upon the SiO$_2$ granulate which is heated and at the same time purified.

An application of the process has been shown to be particularly favorable where the fuel gas comprises the halogen-containing component, whereby the fuel gas flame is formed by an exothermic reaction between the hydrogen-containing component and the halogen-containing component.

The $SiO_2$ granulate is heated and at the same time purified by the fuel gas flame in this method as well. Oxidation of the hydrogen-containing component results from an exothermic reaction with the halogen-containing component. The halogen-containing component is supplied directly into the fuel gas flame where the component can develop its greatest purifying effect due to the relatively high flame temperature. Because of the high temperatures the fuel gas flame promotes creation of halogen radicals which, due to their high reactivity, can have a positive effect on the purification of the $SiO_2$ granulate.

A fuel gas has been shown to be particularly advantageous in which gas the halogen-containing component is present in a stoichiometric surplus in relation to the hydrogen-containing component. The stoichiometric surplus relates to the reaction products of halogen and hydrogen. An excess of halogen favorably affects formation of metal halides versus metal oxides. Insofar as metal oxides are already present as contaminants in the granulate, the halogen can replace the oxygen or it can prevent further oxidation. An advantage of this method can be seen in that metal halides generally have a lower boiling point than metal oxides and are therefore more easily removed through the gas phase. This effect, which is particularly noticeable with so-called non-ferrous metals, is of course favorably affected by keeping the fuel gas low on oxygen, or oxygen-free. In addition, it is useful to work with a halogen surplus for safety reasons because this assures as complete a reaction of the available hydrogen as possible.

In a preferred application of the process, hydrogen is used as the hydrogen-containing component and molecular halogen is used as the halogen-containing component. The exothermic reaction in the fuel gas flame is based on a halogen-detonating gas reaction, permitting high temperatures of the fuel gas flame. Highly pure hydrogen and/or halogen gases are available commercially. The corresponding reaction product, namely hydrogen halide, reacts with the usual contaminants of the $SiO_2$ granulate and hence additionally contributes to its purification. A halogen-detonating gas burner is normally used to create the halogen-detonating gas reaction.

The purification process according to the invention is particularly simple and effective when chlorine is used as the halogen-containing component. Both molecular chlorine and the product of the reaction with the hydrogen-containing component, namely hydrogen chloride, contribute to the purification of the $SiO_2$ granulate by forming volatile metal-chlorine compounds. Temperatures of over 1,600° C. can easily be attained with a chlorine-detonating gas flame. The enthalpy of the chlorine-detonating gas reaction $$H_2 + Cl_2 \rightarrow 2HCl$$

is about 241.98 kJ. The metal chlorides so formed have a relatively low boiling point. This effect can be additionally increased by a chlorine surplus, in that compounds of metallic contaminants and oxygen are replaced by the corresponding chlorides, or in that a further oxidation is prevented. Due to the high temperature in the fuel gas flame, chlorine radicals are also formed which, due to their reactivity, especially readily react with metallic contaminants.

The purification effect of the process according to the invention is additionally increased in that the $SiO_2$ granulate is finely dispersed when introduced into the fuel gas flame. The introduction into the fuel gas flame can be accomplished for example by pouring or spraying. An advantage of proceeding in this manner is that the $SiO_2$ granulate is present in the fuel gas flame in a finely distributed form—hereinafter this will be called 'dispersing'—which prevents agglomeration of the $SiO_2$ granulate. Such agglomeration has been observed in the process described initially when the $SiO_2$ granules, softened in the rotary kiln, begin to adhere to one another. This reduces the purification effect of the treatment gas. In contrast, dispersing, especially by pouring or spraying into the fuel gas flame allows heating of the $SiO_2$ granules to high temperatures while separated from one another so that they cannot adhere to each other. Therefore, dispersing into the fuel flame allows all granules to be exposed to the treatment gas equally, and in addition, at especially high temperatures. The purification effect of the treatment gas therefore becomes not only better but, due to prevention of agglomeration, also more reproducible.

Temperatures of the fuel gas flame in the range between 1,600° C. and 2,200° C. have been shown to be suitable. In this range the treatment gas develops good purification without complete melting of the $SiO_2$ granulate. However, this range should only be viewed as an approximate base value because the flame temperature is lowered by the introduction of the $SiO_2$ granulate into the fuel gas flame, depending on the granulate throughput rate. The fuel gas flame makes temperatures possible which result in a complete melting of the granulate. However, a complete melting and the corresponding alteration of the morphology or internal structure of the granulate is frequently not desired. Moreover, there is danger of agglomerate formation if the softened granules come in contact with one another or the surrounding walls. On the other hand, a brief and superficial melting of the granules which can be observed at a flame temperature of around 1,800° C. causes a spheroidization of the $SiO_2$ granulate which in most cases is desirable. Adhesion of the granulate is prevented by the fine dispersion in the flame and by the cooling and solidification of the surfaces before a contact with the surrounding walls. Setting such high treatment temperatures in the process according to the invention is possible because the granulate can be exposed to the fuel gas flame without having to at the same time heat parts of the purification apparatus to equally high temperatures. By contrast, treatment temperatures of about 1,400° C. in the known purification process reach temperature resistance limits of the rotary kiln.

It has been shown to be advantageous to supply the reaction products and the $SiO_2$ granulate from the reaction zone immediately into a cyclone. In the cyclone, the granulate is separated from the gaseous components enriched with contaminants which were removed from the $SiO_2$ granulate.

The apparatus according to the invention for implementation of the process described above comprises a burner supplied with a fuel gas which generates a fuel gas flame and with a halogen-containing component, a supply device by which the $SiO_2$ granulate is supplied into the fuel gas flame, and a separating device for the separation of the $SiO_2$ granulate from a waste gas.

The fuel gas flame generated by the fuel gas burner simultaneously heats the $SiO_2$ granulate and purifies it at high temperature. For this purpose the fuel gas comprises a hydrogen-containing component which is burned in an exothermic reaction. The burner has a suitable burner nozzle for the hydrogen-containing component.

A halogen-containing component is supplied to the burner for the purification of the granulate. The burner has a suitable burner nozzle for the halogen-containing component. The halogen-containing component may also be a component of the fuel gas and a co-reactant of the hydrogen-containing component.

A supply device supplies the SiO₂ granulate into the fuel gas flame to be heated and purified. The supplying can take place for example by pouring, in which case the supply device is then designed as a hopper. The supplying may also take place by spraying or injecting, where in these cases the supply device comprises a nozzle and a pressurization device for creating pressure or vacuum. It is of substance that the SiO₂ granulate can be supplied to the fuel gas flame and be dispersed therein by means of the supply device.

Furthermore, the apparatus according to the invention is distinguished by a separating device by which the SiO₂ granulate can be separated from a waste gas. Possible separating devices are for example suction or pump devices, or a cyclone.

Especially simple is an embodiment of the apparatus according to the invention where the burner is a chlorine-detonating gas burner. High temperatures of over 1,300° C. are easily attained with a chlorine-detonating gas flame.

A separating device has proven itself which comprises a cyclone. A cyclone allows simple separation of the purified granulate on commercial scale.

An embodiment of the apparatus has been shown to be advantageous in which the cyclone has an inlet opening at which the burner is directed, whereby the supply device is arranged between the burner and the inlet opening. The burner flame is directed toward the inlet opening so that the gas stream emerging from the burner enters directly into the cyclone through the inlet opening. The SiO₂ granulate is brought into the fuel gas flame between the burner and the inlet opening and is carried by the gas stream in the direction toward the inlet opening. In this way it becomes possible to introduce the waste gas and the SiO₂ granulate directly from the reaction zone into the cyclone and to separate them there from one another. To facilitate the introduction of the gas stream, the inlet opening of the cyclone widens advantageously in the manner of a cone toward the burner.

Especially well-proven is an embodiment of the apparatus according to the invention which has a heating device between the burner and the separating device. The heating device allows the setting or maintaining of a predetermined temperature profile which the granulate is to traverse in the gas stream between the burner and the separating device.

With a view to avoiding metallic contamination by the apparatus itself, the burner, the supply device and/or the separator are advantageously made of quartz glass.

BRIEF DESCRIPTION OF THE DRAWINGS

The apparatus and process for the purification of SiO₂ granulates according to the invention are explained in more detail below by way of an exemplary embodiment and a drawing. The drawing schematically shows in FIG. 1, a first embodiment of the apparatus according to the invention for the purification of SiO₂ granulate, and in FIG. 2, an additional embodiment of the apparatus according to the invention for the purification of SiO₂ granulate.

DETAILED DESCRIPTION

Figure 1:
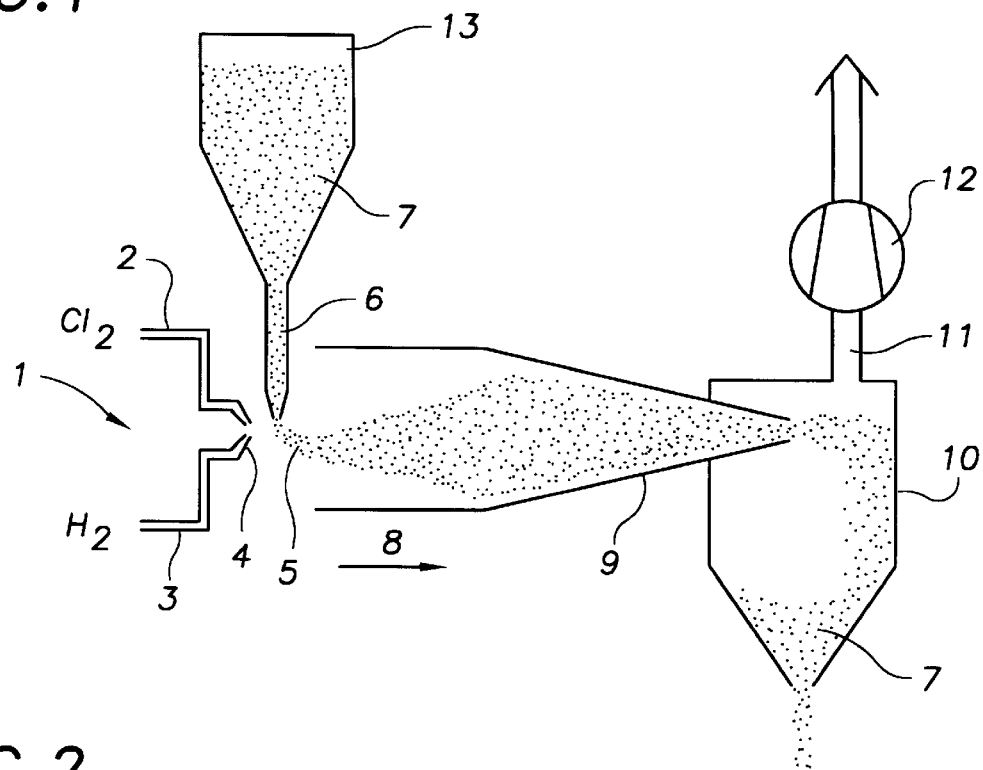

In FIG. 1 the reference number 1 is assigned overall to a chlorine-detonating gas burner. The chlorine-detonating gas burner 1 is provided with a gas inlet 2 for the chlorine and a further gas inlet 3 for the hydrogen. Chlorine and hydrogen emerge through separate burner nozzles from the burner head 4 and react with one another in an exothermic chlorine-detonating gas reaction in a burner flame 5 while forming HCl. The flow direction of the gas stream emerging from the burner head 4 is indicated by the arrow 8. A hopper tube 6 which is connected to a supply container 13 for the SiO₂ granulate 7, has its opening above the reaction zone 5. By means of hopper tube 6, the SiO₂ granulate 7 is poured vertically in relation to stream direction 8 into the burner flame 5. From there the SiO₂ granulate 7 is supplied to a intake funnel 9 of a is cyclone 10 which is arranged along stream direction 8 The purified SiO₂ granulate 7 is separated from waste gas 11 in the cyclone 10. A fan 12 is provided for this. Burner 1, hopper tube 6, supply container 13, intake funnel 9 and cyclone 10 are each made of quartz glass.

An example of the process according to the invention is described below by way of the purification device represented schematically in FIG. 1.

Burner 1 is supplied with 2 mol/min of hydrogen and 2.1 mol/min of chlorine. The chlorine and hydrogen react exothermically in a chlorine-detonating gas reaction according to the chemical equation $$H_2 + Cl_2 \rightarrow 2HCl \tag{1}$$

while forming a burner flame 5. Enthalpy of the chlorine-detonating gas reaction equals 241.98 kJ. In the example this results in a maximum burner flame temperature of 1,800° C. in the area of the burner head 4.

Supplying chlorine to the burner in stoichiometric surplus as regards the reaction equation (1) assures complete combustion of the hydrogen, and the flame also contains free chlorine beside HCl. Furthermore, free chlorine radicals form in the burner flame. This gas mixture in the burner flame 5 will be hereinafter described as 'purification gas.'

The quartz granulate 7 is a granulate of naturally occurring crystalline quartz. The average size of the quartz granules is about 180 μm; in addition to contaminants in form of alkali and alkaline earth oxides, the granulate also contains compounds of so-called non-ferrous metals such as Fe, Cu, Ni, Cr and Al, as can be seen in the first line of the table below.

TABLE 1

| | Contaminants in ppb | | | | | | | | | |
|---|---|---|---|---|---|---|---|---|---|---|
| Granulate | Na | K | Li | Mg | Ca | Al | Fe | Cu | Ni | Cr |
| before | 1100 | 1050 | 710 | 32 | 370 | 16000 | 410 | 9.5 | 7.2 | 14.0 |
| after | <10 | <10 | <10 | 32 | 370 | 16000 | <50 | <1 | <1 | <1 |

The finely distributed quartz granulate is continuously poured into the fuel gas flame 5 through hopper tube 6. The supply rate in the example is approximately 100 g/min. The granules are evenly distributed in the flame by the pouring and are instantly heated. Larger granules and those with internal defects burst. Contaminants contained in the granules are thus exposed. The purification gas can act at a high temperature upon the fine-grain quartz granulate 7 which is finely distributed in the fuel gas flame 5 whereby solid oxide contaminants are converted into corresponding volatile chlorides. The even pouring of the quartz granulate 7 into the fuel gas flame 5 prevents formation of agglomerates. Reactivity of the purification gas is increased by the high temperature of fuel gas flame 5. In addition, reactivity of the purification gas is enhanced even more by the fine distribution of the quartz granulate 7 in the burner flame 5 due to creation of new surfaces and the exposure of contaminants when the granules burst, and by the reactive chlorine radicals. Temperature of the fuel gas flame 5 is chosen such that the granulate being poured softens on the surface so that the quartz granules 7 attain a certain roundness. It should be noted here that pouring-in of the quartz granulate 7 lowers the temperature of the fuel gas flame 5.

The purified quartz granulate 7 is supplied to the cyclone 10 by the gas stream of the fuel gas flame 5 and is separated in the said cyclone from the waste gas (indicated in FIG. 1 by exhaust nipple 11) which waste gas contains the volatile compounds of the removed contaminants. At this stage the surface of the quartz granulate 7 is solidified to such degree that adhesion to the discharge cone 9 and cyclone 10 is prevented.

The purity of the $SiO_2$ granulate achieved by the process according to the invention is shown in the second line of Table 1.

Figure 2:
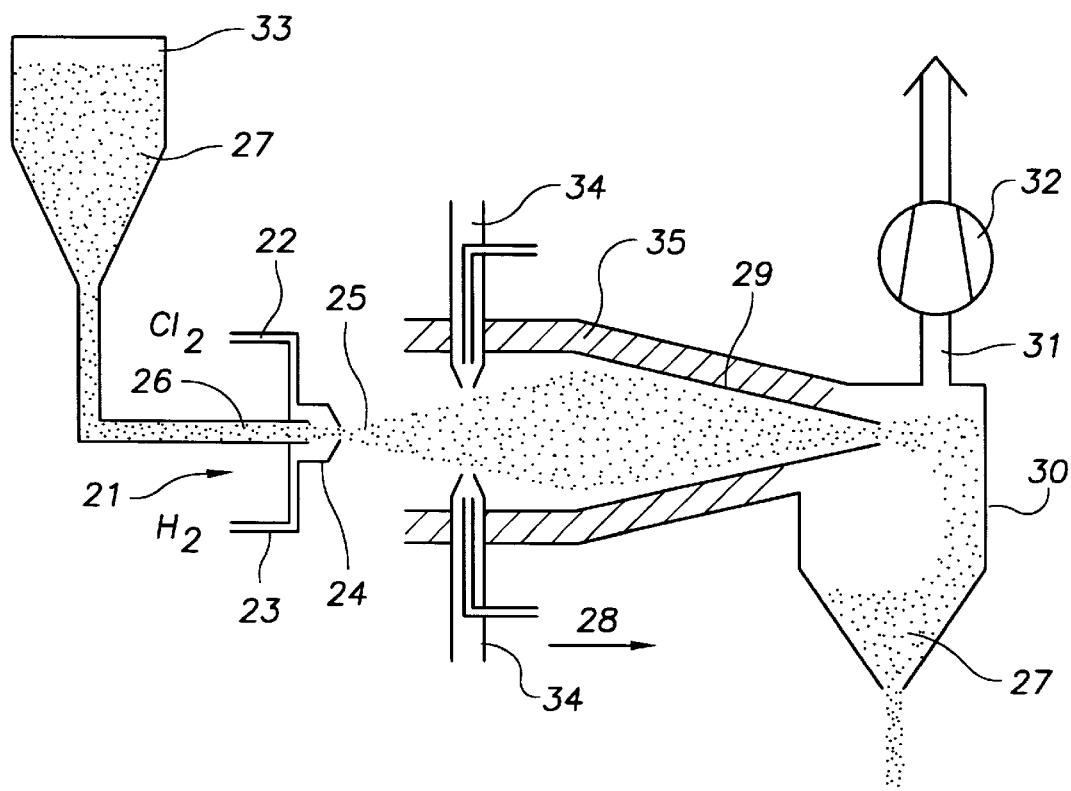

In the embodiment of the apparatus according to FIG. 2 a chlorine-detonating gas burner 21 is provided which has a gas inlet 22 for chlorine and another gas inlet 23 for hydrogen, both extending coaxially around a venturi nozzle 24 of the burner 21. Granulated $SiO_2$ starting material 27 is supplied from a supply container 33 to the venturi nozzle 24 via a quartz glass tube 26. The $SiO_2$ starting material 27 is carried along by the chlorine and hydrogen fuel gases and is thereby dispersed in the chlorine-detonating gas flame 25. The supply rate of the $SiO_2$ starting material 27 is influenced by the gas stream of the fuel gases. In the example, the burner 21 is supplied with 4.0 mol/min of hydrogen, 4.5 mol/min of chlorine and 200 g/min of granulated $SiO_2$ starting material 27.

As viewed in stream direction 28 of the gas stream, a propane burner 34 is arranged ring-shaped around an intake funnel 29 of a cyclone 30. The intake funnel 29 is enclosed by heat insulation 35. In the cyclone 30 the purified $SiO_2$ starting material 27 is separated from the waste gas (shown in FIG. 2 by outlet nipple 31) by means of a blower 32. Burner 21, quartz tube 26, supply container 33, intake funnel 29 and cyclone 30 are each made of quartz glass.

Drawing on the above description of the process, a further exemplary embodiment is described below by way of the purification apparatus schematically represented in FIG. 2.

A substantial difference vis-a-vis the process described by way of FIG. 2 is in the supply of the granular $SiO_2$ starting material to the chlorine-detonating flame 25 by means of venturi nozzle 24 of the chlorine-detonating burner 21. This permits a simple regulation of the supply rate of the $SiO_2$ starting material in dependence on the adjustment of the chlorine and hydrogen fuel gas stream. By adjusting a suitable nozzle gap or by supplying an additional gas to the chlorine-detonating burner 21 the gas stream can be corrected according to need. In the example, the burner 21 is supplied with 4 mol/min of hydrogen and 4.5 mol/min of chlorine, resulting in the $SiO_2$ starting material 27 being supplied at a rate of 200 g/min. The process allows a rapid and, especially, a reproducible heating of the $SiO_2$ starting material 27 in that it is supplied by means of venturi nozzle 24 directly into the center of the chlorine-detonating gas flame 25 in an especially finely distributed form. This prevents the granulate from being blown by the gas stream away from the chlorine-detonating gas flame 21.

Another substantial difference from the method of proceeding described at first is in the temperature profile to which the granular $SiO_2$ starting material 27 is exposed in the area of the chlorine-detonating gas burner 25. An additional heat zone is created by means of the ring-shaped propane burner 34 with a temperature of around 1,850° C., making it easier to set a predetermined temperature profile along the purification path between the chlorine-detonating gas burner 21 and the cyclone 30, and also preventing a rapid cooling of the $SiO_2$ granulate 27. In this way the purification effect of the chlorine-containing purification gas can be improved. Heat insulation 35 facilitates attaining the desired temperature profile.

As an alternative to the ring-shaped arrangement of the propane burner 34, a simple single burner, or several burners in series, are provided along the gas stream path 28. Propane is an inexpensive and relatively easy-to-handle fuel gas. However, instead of propane, another suitable fuel gas can be used, in particular a halogen-containing fuel gas such as chlorine and hydrogen, which additionally contributes to the purification of the granulate.

What is claimed is:

1. A process for the purification of a $SiO_2$ granulate containing contaminants, said process comprising:

supplying the $SiO_2$ granulate into a reaction zone where the $SiO_2$ granulate is heated and exposed to a treatment gas having a halogen-containing component, reacting the halogen-containing component of the treatment gas with the contaminants in the $SiO_2$ granulate and creating therewith volatile reaction products; and removing the reaction products from the reaction zone; wherein the treatment gas comprises a fuel gas including a hydrogen-containing component which is combusted in the reaction zone with the halogen-containing component as to form a fuel gas flame to which the $SiO_2$ granulate is exposed.

2. The process according to claim 1, wherein the fuel gas is mixed with the halogen-containing component and the fuel gas flame is formed by an exothermic reaction between the hydrogen-containing component and the halogen-containing component.

3. The process according to claim 2, wherein the halogen-containing component is supplied in stoichiometric excess relative to the hydrogen in the hydrogen-containing component.

4. The process according to claim 1, wherein the hydrogen-containing component is hydrogen gas and the halogen-containing component comprises a molecular halogen gas.

5. The process according to claim 4, wherein the halogen-containing component is chlorine.

6. The process according to claim 1, wherein the $SiO_2$ granulate is dispersed into the fuel gas flame.

7. The process according to claim 1, wherein the fuel gas flame is adjusted to a temperature ranging from 1,600° C. to 2,200° C.

8. The process according to claim 1, wherein the reaction products and the $SiO_2$ granulate are removed from the fuel gas flame and passed into a cyclone for separation.

9. The process of claim 1 wherein the contaminants are alkali or alkaline earth metals.

10. The process of claim 1 wherein the contaminants are alkali metals.

11. A process for purifying $SiO_2$ granules containing contaminants, said process comprising:

supplying a fuel gas having a component gas containing hydrogen;

supplying a treatment gas having a component gas containing a halogen;

combining said fuel gas and treatment gas so that combustion occurs between the fuel gas and the treatment gas in the reaction zone, said combustion producing a fuel gas flame;

introducing said $SiO_2$ granules into said fuel gas flame, said flame and treatment gas purifying said $SiO_2$ granules of the contaminants to yield treated $SiO_2$ material and waste reaction products;

removing said treated $SiO_2$ material and said waste reaction products from the reaction zone.

12. The process of claim 11, and further comprising:
separating said treated $SiO_2$ material from said waste reaction products with a separator.

13. The process of claim 12 wherein the separator is a cyclone separator.

14. The process of claim 11 wherein the hydrogen-containing component gas is $H_2$.

15. The process of claim 14 wherein the halogen-containing component gas comprises a molecular halogen.

16. The process of claim 14 wherein the halogen-containing component gas is $Cl_2$.

17. The process of claim 11 wherein the fuel gas flame is maintained at a temperature of about 1600 to 2200° C.

18. The process of claim 11 wherein the contaminants are alkali or alkaline earth metals.

19. The process of claim 11 wherein the contaminants are alkali metals.

* * * * *